(12) United States Patent
Ferguson, Jr.

(10) Patent No.: US 12,131,160 B1
(45) Date of Patent: Oct. 29, 2024

(54) DATA PROCESSING SYSTEM AND METHODS THEREOF

(71) Applicant: Roscoe C. Ferguson, Jr., Sugar Land, TX (US)

(72) Inventor: Roscoe C. Ferguson, Jr., Sugar Land, TX (US)

( * ) Notice: Subject to any disclaimer, the term of this patent is extended or adjusted under 35 U.S.C. 154(b) by 15 days.

(21) Appl. No.: 18/136,172

(22) Filed: Apr. 18, 2023

Related U.S. Application Data

(60) Provisional application No. 63/425,243, filed on Nov. 14, 2022.

(51) Int. Cl.
*G06F 9/38* (2018.01)
*G10L 13/047* (2013.01)

(52) U.S. Cl.
CPC .......... *G06F 9/3838* (2013.01); *G10L 13/047* (2013.01)

(58) Field of Classification Search
None
See application file for complete search history.

(56) References Cited

U.S. PATENT DOCUMENTS

2023/0410011 A1\* 12/2023 Ofoche ............ G06Q 10/06312

\* cited by examiner

*Primary Examiner* — Scott C Sun
(74) *Attorney, Agent, or Firm* — Richard Eldredge; Leavitt Eldredge Law Firm

(57) ABSTRACT

A data processing system for separating complex programming algorithms into networks and computations is disclosed. The networks store logic in the form of relationships that is utilized to make decisions, and the computations are reduced to simple data processing algorithms. The data processing system includes a central processing unit; one or more relationship units; a layer unit; a layer router; a relationship path unit; a frame capture unit; and a frame controller.

5 Claims, 4 Drawing Sheets

DATA PROCESSING SYSTEM AND METHODS THEREOF

BACKGROUND

1. Field of the Invention

The present invention relates generally to data processing systems, and more specifically to a data processing system that separates complex programming algorithms into networks and computations, wherein the networks store logic in the form of relationships that is utilized to make decisions, wherein the computations are reduced to simple data processing algorithms. The core of the domain logic complexity is represented by networks which can utilize the principles of Network Science to analyze the complexity within a complex system with the ability to identify both direct and indirect dependencies within a system.

2. Description of Related Art

Generally, logic is abstracted to be executed on a traditional central processing unit (CPU) and an arithmetic logic unit (ALU). Within the last decade, advancements in computer programming have allowed logic to become more complex. However, such logic is costly to maintain and manage during the software development lifecycle. In addition, complex logic of current computer programming is represented in high level languages that become translated into machine language. When such logic is abstracted, the high-level language is converted into an unrecognizable form. Thus, the demand for an improved data processing system for maintaining and managing complex logic has significantly grown.

Accordingly, it is an object of the present invention to provide a data processing system that addresses the limitations discussed above.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
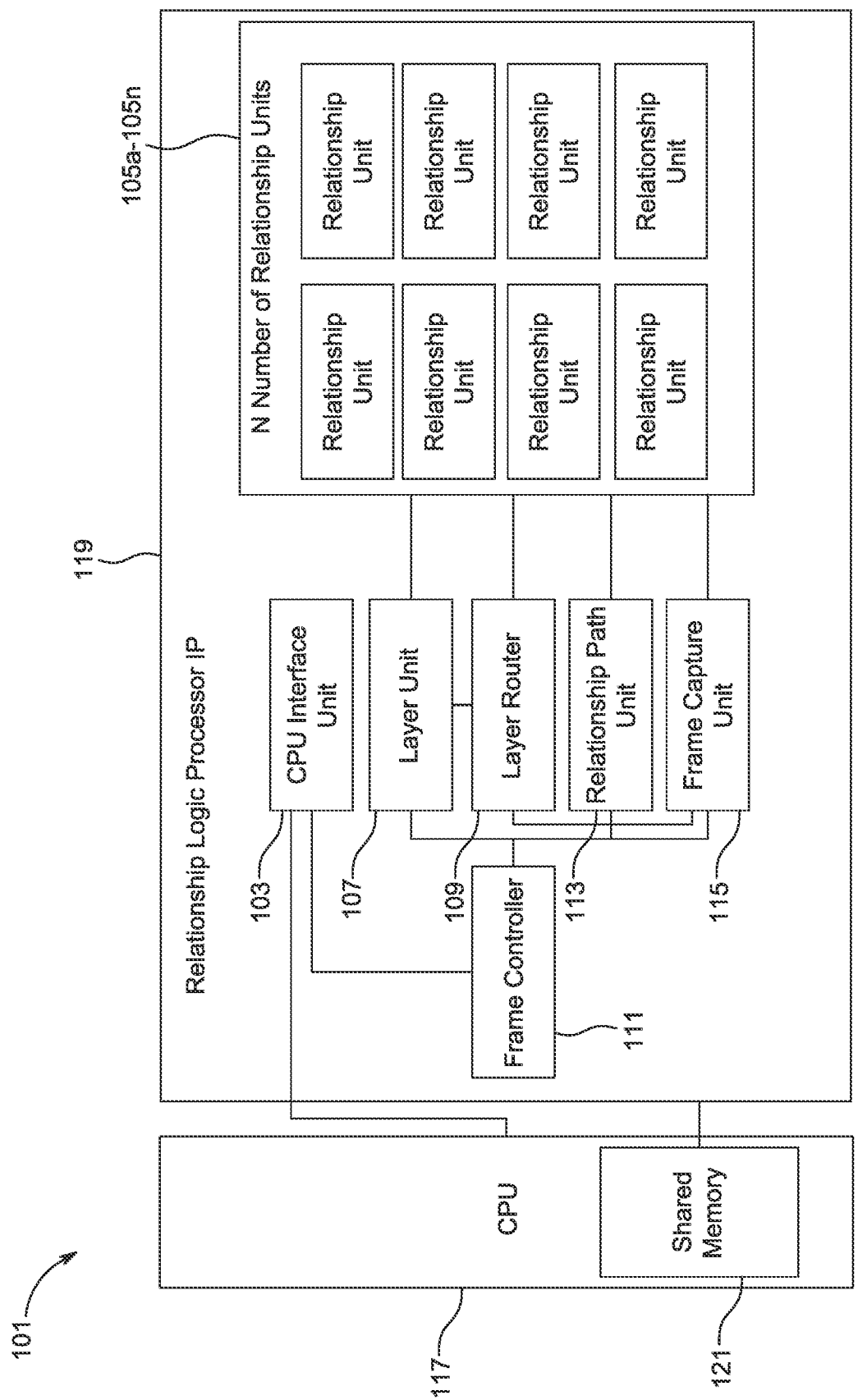
FIG. 1 is a schematic representation of a data processing system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional data processing systems. Specifically, the system of the present invention allows logic abstracted in high-level languages to be translated in the same form and be executed as networks. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic representation of a data processing system 101 in accordance with a preferred embodiment of the present application. It will be appreciated that system 101 overcomes one or more of the above-listed problems commonly associated with conventional data processing systems.

In the contemplated embodiment, system 101 includes a central processing unit (CPU) interface unit 103, one or more relationship units (e.g., first relationship unit 105a, second relationship unit 105b, ... nth relationship unit 105n; generally referred to as relationship unit 105), a layer unit 107, a layer router 109, and a frame controller 111. In some embodiments, system 101 also includes a relationship path unit 113 and a frame capture unit 115. It should be appreciated that more or fewer of such components may be included in different embodiments of system 101.

The CPU interface unit 103 is configured to manage the interface between a central processing unit (CPU) 117 and a relationship logic processor intellectual property (IP) 119 (i.e., CPU 117 to relationship logic processor 119 and relationship logic processor IP 119 to CPU 117). The CPU interface unit 103 triggers the start of frame processing by the frame controller 111.

The relationship unit 105 is configured to process logic from flow through a network representation which includes nodes and links, wherein logic is extracted from network path flow. A relationship unit can be assigned to one or more layers.

The layer unit 107 is configured to manage flow of logic through the relationship unit 105 which provides order in the form of the sequential processing of sets of relationship units.

The layer router 109 is configured to route the output of the relationship unit 105 to the input of the relationship unit 105 on different layers after each layer is processed.

The frame controller 111 is configured to manage the frame-to-frame processing of relationship processing for the data processing system 101. It should be noted that the frame controller 111 serves as the control unit of the relationship logic processor 119. The frame controller 111 manages the layer unit 107, the layer router 109, the relationship path unit 133, and the frame capture unit 115.

The relationship path unit 113 is configured to provide the ability to receive requests to determine the paths or relationships between a start and end point in a network. Upon determination, the relationship path unit 113 will then return a list of routes that defines all the relationships between the two end points. The relationship path unit 113 can translate the list of routes into language text that can be utilized to support such functionality as text-to-speech operations. It should be noted that the relationship path unit 113 is controlled from frame logic path analysis.

The frame capture unit 115 is configured to capture frame-to-frame analysis of paths taken through a network. It should be noted that the frame capture unit 115 is used to support the concept of debugging of logic from network flow. The frame capture unit 115 is controlled by the frame controller 111 and interfaces with the relationship path unit 113 and the layer router 109.

System 101 further includes a shared memory 121. The shared memory 121 provides the mechanism for the configuration of the relationship processor IP 119 and data exchange between the CPU 117 and the relationship logic processor IP 119. The configuration includes network and router configuration whereas the network configuration contains the definition of relationships for logic and router configurations defines the routes to flow logic paths between network layers.

It should be appreciated that system 101 can be implemented as: (1) an intellectual property (IP) for a field programmable gate array (FPGA) to be interfaced with a CPU; (2) an IP to be incorporated into a system-on-a-chip (SOC) within a hybrid FPGA and hard processor; or (3) as an application specific integrated circuit (ASIC) to be interfaced with a CPU.

It should also be appreciated that one of the unique features believed characteristic of the present application is that it provides a means for complex logic of an algorithm to be stored in the form of networks. Networks are a natural form to represent complexity and thus, complex logic can be abstracted in a single form that is the same for both programming and execution.

Figure 2:
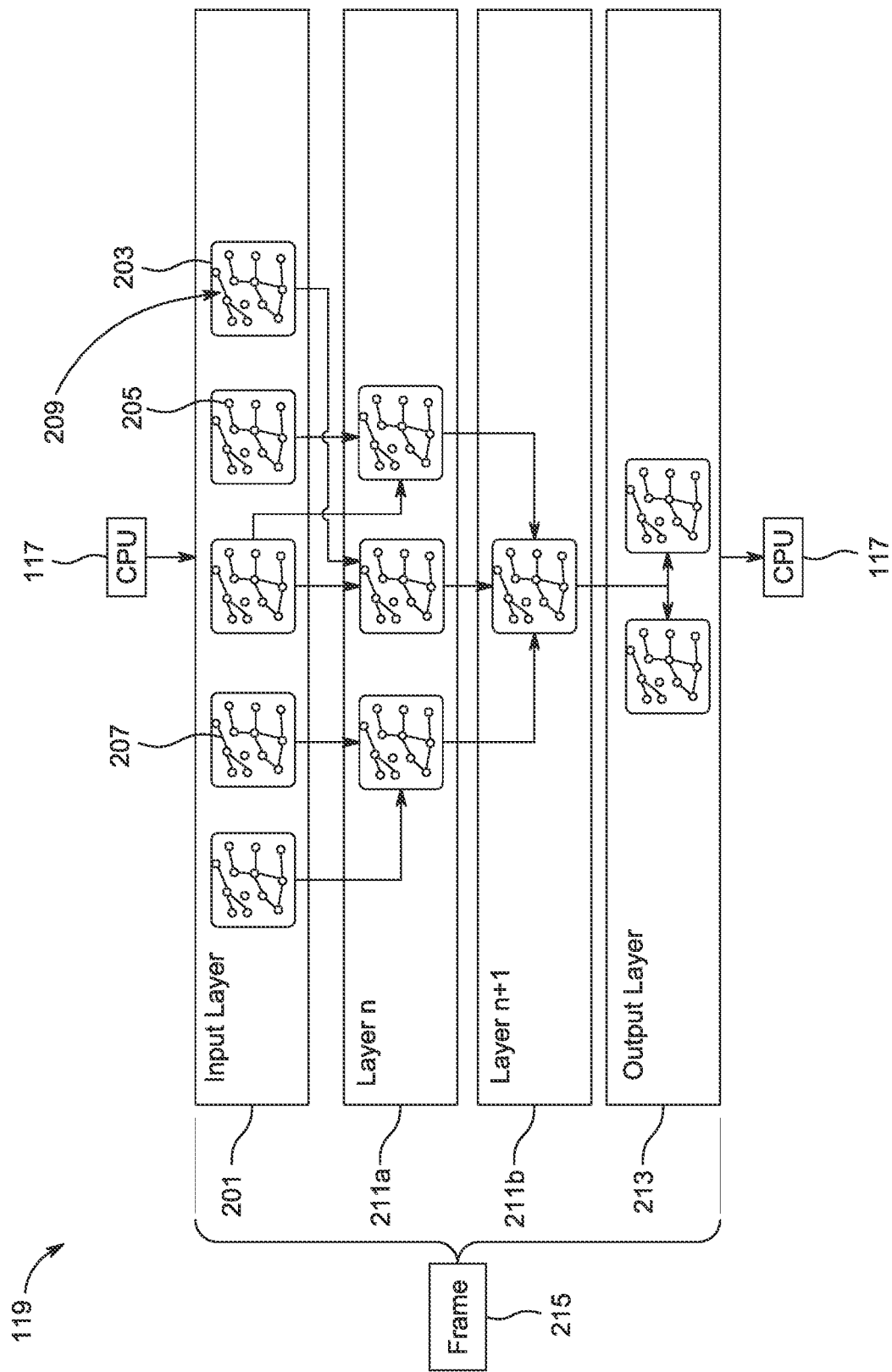
FIG. 2 is a schematic representation of a logical view of processing logic representing in the form of relationships from networks in accordance with one or more embodiments of the present application.

FIG. 2 illustrates a schematic representation of the logic processing within the relationship processor IP 119. As shown, the relationship processor IP 119 receives input from the CPU 117. Input from the CPU 117 provides state that is calculated using CPU computations for an input layer 201. The input layer 201 consists of a set of one or more networks 203. Each network includes a plurality of nodes 205 with a plurality of links 207 between nodes 205. It should be understood that the links 207 between the nodes 205 represent the relationships 209 between nodes 205, and thus, logic is represented as relationships within the set of one or more networks 203.

The results of the CPU computations within the input layer 201 are converted into discrete state which correspond to nodes 205 within the networks 203. The propagation of logic flows into layer n, 211*a*, layer n+1, 211*b*, etc., and then an output layer 213. A frame 215 of the flow of state through all defined layers (e.g., layers 201, 211, and 213) of the set of networks 203. It should be understood that logic paths are evaluated using route propagation through the networks 203.

Figure 3:
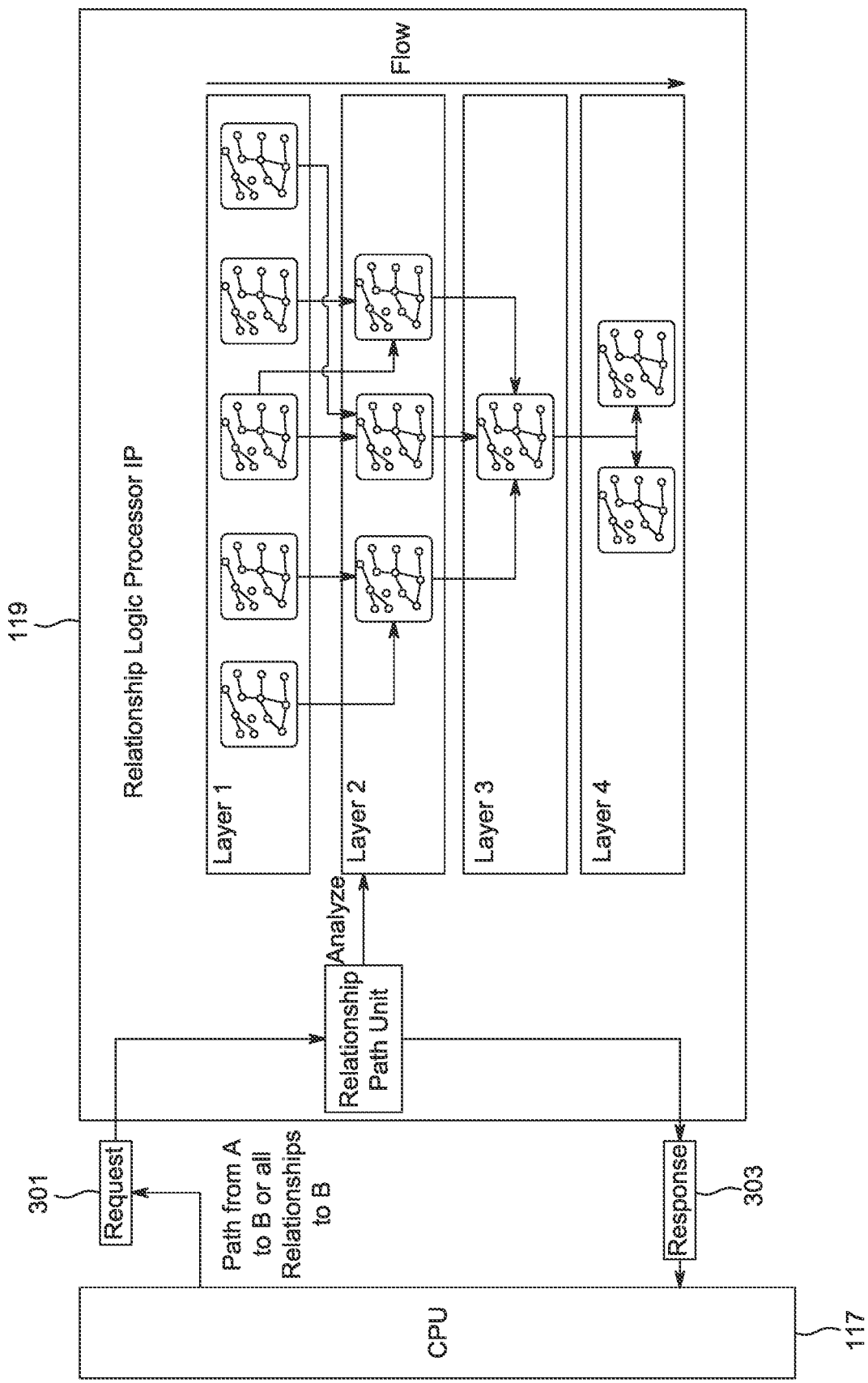
FIG. 3 is a schematic representation of an ability to query the data processing system of FIG. 1 for "what if" scenarios and receive responses in the form of raw data or textual responses suitable to support downstream text to speech capabilities in accordance with one or more embodiments of the present application.

FIG. 3 is a schematic representation of the ability to make inferences against the logic represented in the form of relationships by networks. The CPU 117 can request 301 the routes through the network required to map a start node to an end node. This is similar in concept of how a Global Positioning Satellite (GPS) Application can provide the driving directions between a source and destination location. The relationship processor IP 119 returns the results or response 303 as a set of nodes and links for the possible routes or in a representation using textual language similar in concept to the driving directions from a GPS application.

Figure 4:
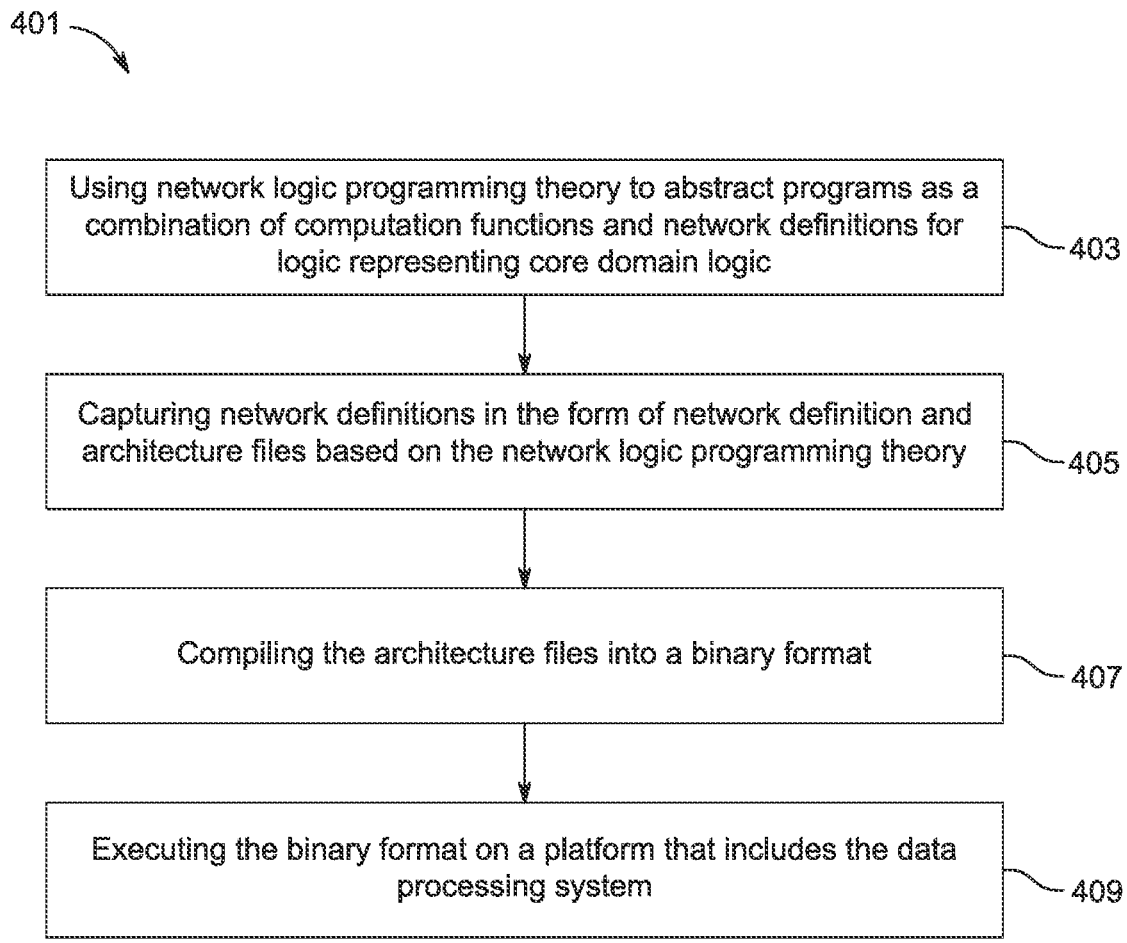
FIG. 4 is a flowchart illustrating a method for implementing the system of FIG. 1.

In FIG. 4, a flowchart illustrates an overall methodology 401 of system 101. First, the network logic programming theory is used to abstract programs as a combination of computation functions and network definitions for logic representing core domain logic, as shown with box 403. Then, the network definitions are captured in the form of network definition and architecture files based on the network logic programming theory, as shown with box 405. Next, the architecture files are compiled into a binary format, as shown with box 407. Then, the binary format is executed on a platform that includes the data processing system, as shown with box 409.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A data processing system, comprising:
   a central processing unit (CPU) interface unit configured to manage the interface between a CPU and a relationship logic processor intellectual property (IP);
   one or more relationship units is configured to process logic from flow through a network representation which includes nodes and links, wherein logic is extracted from a network path flow, wherein a relationship unit from the one or more relationship units can be assigned to one or more layers;
a layer unit configured to manage flow of logic through the relationship unit which provides order in the form of the sequential processing of sets of the one or more relationship units;
a layer router configured to route an output of the one or more relationship units to an input of the one or more relationship units on one or more layers after each layer is processed; and
a frame controller configured to manage the frame-to-frame processing of relationship processing for the layer unit, the layer router, a relationship path unit, and a frame capture unit.

2. The data processing system of claim 1, wherein the relationship path unit is configured to provide the ability to receive requests to determine the paths or relationships between a start point and an end point in a network, and configured to return a list of routes that defines all the relationships between the start point and the end point with the ability to provide as a textual format that can support text-to-speech capability.

3. The data processing system of claim 1, wherein the frame capture unit is configured to capture frame-to-frame analysis of paths taken through a network, the frame capture unit is controlled by the frame controller, and the frame capture unit interfacing with the relationship path unit and the layer router.

4. A data processing system, comprising:
a central processing unit (CPU) interface unit configured to manage the interface between a CPU and a relationship logic processor intellectual property;
one or more relationship units is configured to process logic from flow through a network representation which includes nodes and links, wherein logic is extracted from a network path flow, wherein a relationship unit from the one or more relationship units can be assigned to one or more layers;
a layer unit configured to manage flow of logic through the relationship unit which provides order in the form of the sequential processing of sets of the one or more relationship units;
a layer router configured to route an output of the one or more relationship units to an input of the one or more relationship units on one or more layers after each layer is processed;
a relationship path unit configured to provide the ability to receive requests to determine the paths or relationships between a start point and an end point in a network, and configured to return a list of routes that defines all the relationships between the start point and the end point with the ability to provide as a textual format that can support text-to-speech capability;
a frame capture unit configured to capture frame-to-frame analysis of paths taken through a network, the frame capture unit is controlled by the frame controller, and the frame capture unit interfacing with the relationship path unit and the layer router; and
a frame controller configured to manage the frame-to-frame processing of relationship processing for the layer unit, the layer router, the relationship path unit, and the frame capture unit.

5. A computer-implemented method, comprising:
providing a data processing system, the data processing system comprising:
a central processing unit (CPU) interface unit configured to manage the interface between a CPU and a relationship logic processor intellectual property;
one or more relationship units is configured to process logic from flow through a network representation which includes nodes and links, wherein logic is extracted from a network path flow, wherein a relationship unit from the one or more relationship units can be assigned to one or more layers;
a layer unit configured to manage flow of logic through the relationship unit which provides order in the form of the sequential processing of sets of the one or more relationship units;
a layer router configured to route an output of the one or more relationship units to an input of the one or more relationship units on one or more layers after each layer is processed;
a relationship path unit configured to provide the ability to receive requests to determine the paths or relationships between a start point and an end point in a network, and configured to return a list of routes that defines all the relationships between the start point and the end point with the ability to provide as a textual format that can support text-to-speech capability;
a frame capture unit configured to capture frame-to-frame analysis of paths taken through a network, the frame capture unit is controlled by the frame controller, and the frame capture unit interfacing with the relationship path unit and the layer router; and
a frame controller configured to manage the frame-to-frame processing of relationship processing for the layer unit, the layer router, the relationship path unit, and the frame capture unit;
using network logic programming theory to abstract programs as a combination of computation functions and network definitions for logic representing core domain logic;
capturing network definitions in the form of network definition and architecture files based on the network logic programming theory;
compiling the architecture files into a binary format; and
executing the binary format on a platform that includes the data processing system.

* * * * *